United States Patent [19]

Spector

[11] Patent Number: 5,187,505

[45] Date of Patent: Feb. 16, 1993

[54] LAMINATED LENS WAFERS

[75] Inventor: David P. Spector, Sausalito, Calif.

[73] Assignee: Pilkington Visioncare, Inc. (a CA. corp.), Menlo Park, Calif.

[21] Appl. No.: 656,599

[22] Filed: Feb. 19, 1991

[51] Int. Cl.$^5$ .............................................. G02C 7/02
[52] U.S. Cl. .................................... 351/159; 351/166; 351/177
[58] Field of Search ................ 351/159, 168, 177, 166

[56] References Cited

U.S. PATENT DOCUMENTS

| 4,547,049 | 10/1985 | Cotie | 351/159 |
| 4,679,918 | 7/1987 | Ace | 351/159 X |
| 4,867,553 | 9/1989 | Frieder | 351/159 X |

*Primary Examiner*—Scott J. Sugarman
*Attorney, Agent, or Firm*—Harris Zimmerman

[57] ABSTRACT

A series of back wafers for a laminated ophthalmic lens, wherein successive members of the series have a diopter difference in their concave curvature which is sufficiently small to enable a member of the series to be used in combination with any design and power of front wafer to produce a finished lens within the normal tolerance for such a lens. Preferably the diopter difference is ⅛ of a diopter. The invention also comprises a method of producing a laminated lens from the wafers. The series of back wafers enables the production of a finished lens within the normal tolerances for such lenses.

4 Claims, 1 Drawing Sheet

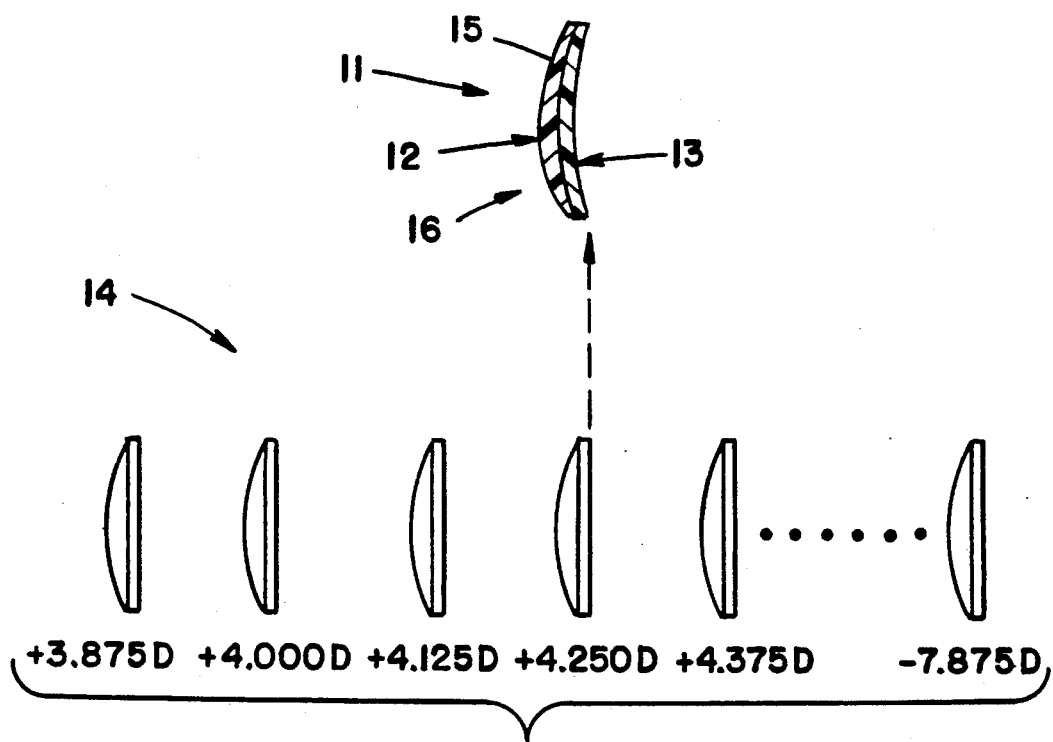
FIG_1
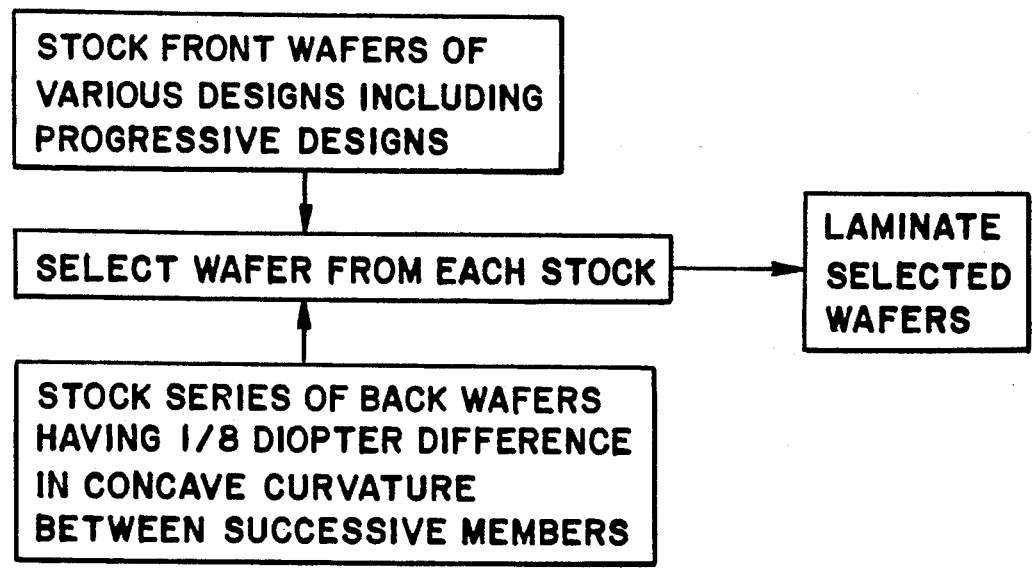
FIG_2

LAMINATED LENS WAFERS

BACKGROUND TO THE INVENTION

This invention relates to laminated ophthalmic spectacles lenses of the type where the distance power of the laminated lens is derived from the combination of front and back wafers each contributing a component of the distance power.

U.S. Pat. No. 3,877,798 proposes the manufacture of bifocal plastic spectacle lenses by gluing together a front and back wafer. The front wafer carries a bifocal part and has an interface curve of approximately 6 diopter as its concave surface and a front curve contributing part of the distance power. The back wafer has an interface curve of approximately 6 diopter as its convex surface and a back curve contributing the remainder of the required distance power. Laminated lens systems of this type use a series of back wafers whose members have a ¼ diopter difference in curvature of the back curve, if cylinder is ignored.

For non-laminated lenses manufacturers supply a variety of bifocal, trifocal and progressive multifocal semi-finished lenses which have a back curve generated in a grinding and polishing laboratory. Such laboratories use tools which can produce back curves in a series having ⅛ diopter intervals between its members. Such ⅛ diopter intervals allow the laboratory to produce a finished lens falling within the American National standard of ±1/16 diopter for the finished lens through power.

Progressive lenses are usually moulded and the moulds are difficult and expensive to produce. It is desirable that a range of laminate lens front wafers be produced using the same moulds as the current ranges of stock lenses and semi-finished lenses.

It is an object of the present invention to provide laminate back wafers which can be combined with a variety of laminate front wafer designs and powers to produce lenses having through power accuracy comparable to those obtained in the manufacture of lenses from semi-finished lenses by the grinding and polishing route.

SUMMARY OF THE INVENTION

According to the invention there is provided a series of back wafers for a laminated ophthalmic lens, where successive members of the series have a diopter difference in their concave curvature which is sufficiently small to enable a member of the series to be used in combination with any design and power of front wafer to produce a finished lens within the normal tolerances for such lenses.

Preferably the series comprises back wafers with successive nominal power differences of ⅛ diopter in the value of their concave curves. Advantageously, back wafer series according to the invention are used in combination with front wafer designs including progressive designs.

BRIEF DESCRIPTION OF THE DRAWINGS

FIG. 1 is an elevation section view of an example of a laminated ophthalmic lens produced by the method of the invention and of a series of back lens wafer from which the back wafer of the laminated lens has been selected.

FIG. 2 is a block diagram illustrating steps in a method of producing a laminated lens in accordance with the invention.

DESCRIPTION OF PREFERRED EMBODIMENT

The invention will be further described, by way of example only:

Referring to FIG. 1, there are three factors which contribute to the through power of a lens 11. They are the curvature of the front and back surfaces 12 and 13 respectively, the index of refraction and the thickness of the lens. It is the thickness of the lens 11 which we are concerned with when correcting for through power errors with the 0.125 diopter increment back wafers 14.

The thickness of a plus power progressive laminate wafer 15 is determined by the steepest curve on the progressive surface 16. This is the near zone of the lens 11. As the add power in the near zone increases, the thickness of the progressive wafer 15 increases.

For example, an 8 base +1 add progressive wafer 15 of the same design as sold under the name SOLA XL by Pilkington Visioncare Inc will have a center thickness of 5.6 mm and an 8 base +3 add will have a center thickness of 6.8 mm. If a 4.125 diopter back curve 13 is used with both wafers to create a +4 diopter through power lens 11, the through power of the +1 add will be 4.04 diopters while the +3 add will have a through power of 4.09 diopters.

The power error on the +3 part can be reduced by selecting the 4.25 diopter back wafer 14. The through power will now be +3.96 diopters which is within 0.04 diopters of the target power.

The table shows through powers which will result from the combination of 6 and 8 base front wafers 15 with +1 and +3 add powers with back wafers 14 at 0.125 diopter increments. Across the top of the chart is the center thickness, base curve, and the nominal base and add power of the front wafer 15. The first three columns of the chart are the center thickness, the nominal curve and the true curve of the back wafers 14. The columns labelled "actual" contain the power obtained when the curve in that column is combined with the back wafer 14 in that row. The columns labelled nominal and error are the target powers and the difference between target values and the actual power obtained. The shaded areas are examples of how the 0.125 diopter back curves can minimize through power error.

| XL PROGRESSIVES | | | | | | | | N = 1.498 |
|---|---|---|---|---|---|---|---|---|
| FLAT LENTIC/PRISM THINNED TO 60% ADD POWER | | | | | | | | |
| BACK CURVES AT 0.125 DIOPTER INCREMENTS | | | | | | | | |
| FULL RANGE - 5.98 DIOPTER INTERFACE CURVE | | | | | | | | |
| FRONT CT: | | | | 1.71 | | | 3.03 | |
| FRONT CURVE | | | | 5.92 | | | 4.92 | |
| BASE/ADD: | | | | 6/100 | | | 6/300 | |
| BACKS | | | THROUGH POWER | | | | | |
| CT | | CURVES | MINUS PARTS | | | | | |
| (M) | NOM | 0.125 | ERR | NOM. | ACTUAL | ERR | NOM. | ACTUAL |

-continued

| | CT (M) | NOM | 0.125 | ERR | NOM. | ACTUAL | ERR | NOM | ACTUAL |
|---|---|---|---|---|---|---|---|---|---|
| PLUS PARTS | 0.0046 | 3.88 | 3.875 | 0.05 | 2.00 | 2.05 | | | 2.08 |
| | 0.0044 | 4.00 | 4.000 | | | 1.93 | −0.04 | 2.00 | 1.96 |
| | 0.0042 | 4.13 | 4.125 | 0.06 | 1.75 | 1.81 | | | 1.84 |
| | 0.0040 | 4.25 | 4.250 | | | 1.69 | −0.03 | 1.75 | 1.72 |
| | 0.0037 | 4.38 | 4.375 | | | 1.57 | | | 1.60 |
| | 0.0035 | 4.50 | 4.500 | −0.06 | 1.50 | 1.44 | −0.03 | 1.50 | 1.47 |
| | 0.0033 | 4.63 | 4.625 | | | 1.32 | | | 1.35 |
| | 0.0031 | 4.75 | 4.750 | −0.05 | 1.25 | 1.20 | −0.02 | 1.25 | 1.23 |
| | 0.0029 | 4.88 | 4.875 | | | 1.08 | | | 1.11 |
| | 0.0027 | 5.00 | 5.000 | −0.04 | 1.00 | 0.96 | −0.01 | 1.00 | 0.99 |
| | 0.0025 | 5.13 | 5.125 | | | 0.84 | | | 0.86 |
| | 0.0023 | 5.25 | 5.250 | −0.04 | 0.75 | 0.71 | −0.01 | 0.75 | 0.74 |
| | 0.0021 | 5.38 | 5.375 | | | 0.59 | | | 0.62 |
| | 0.0018 | 5.50 | 5.500 | −0.03 | 0.50 | 0.47 | −0.00 | 0.50 | 0.50 |
| | 0.0016 | 5.63 | 5.625 | | | 0.35 | | | 0.38 |
| | 0.0014 | 5.75 | 5.750 | −0.03 | 0.25 | 0.22 | 0.00 | 0.25 | 0.25 |
| | 0.0012 | 5.88 | 5.875 | | | 0.10 | | | 0.13 |
| MINUS PARTS | 0.0010 | 6.00 | 6.000 | | | −0.02 | | | 0.01 |
| | 0.0010 | 6.13 | 6.125 | | | −0.14 | | | −0.11 |
| | 0.0010 | 6.25 | 6.250 | −0.00 | −0.25 | −0.25 | 0.02 | −0.25 | −0.23 |
| | 0.0010 | 6.38 | 6.375 | | | −0.37 | | | −0.34 |
| | 0.0010 | 6.50 | 6.500 | 0.01 | −0.50 | −0.49 | 0.04 | −0.50 | −0.46 |
| | 0.0010 | 6.63 | 6.625 | | | −0.61 | | | −0.58 |
| | 0.0010 | 6.75 | 6.750 | 0.03 | −0.75 | −0.72 | 0.05 | −0.75 | −0.70 |
| | 0.0010 | 6.88 | 6.875 | | | −0.84 | | | −0.81 |
| | 0.0010 | 7.00 | 7.000 | 0.04 | −1.00 | −0.96 | | | −0.93 |
| | 0.0010 | 7.13 | 7.125 | | | −1.08 | −0.05 | −1.00 | −1.05 |
| | 0.0010 | 7.25 | 7.250 | 0.06 | −1.25 | −1.19 | | | −1.17 |
| | 0.0010 | 7.38 | 7.375 | | | −1.31 | −0.03 | −1.25 | −1.28 |
| | 0.0010 | 7.50 | 7.500 | | | −1.43 | | | −1.40 |
| | 0.0010 | 7.63 | 7.625 | −0.05 | −1.50 | −1.55 | −0.02 | −1.50 | −1.52 |
| | 0.0010 | 7.75 | 7.750 | | | −1.66 | | | −1.64 |
| | 0.0010 | 7.88 | 7.875 | −0.03 | −1.75 | −1.78 | −0.00 | −1.75 | −1.75 |

XL PROGRESSIVES  N = 1.498
FLAT LENTIC/PRISM THINNED TO 60% ADD POWER
BACK CURVES AT 0.125 DIOPTER INCREMENTS
FULL RANGE - 5.98 DIOPTER INTERFACE CURVE
FRONT CT: 562  6.81
FRONT CURVE: 8.01  8.01
BASE/ADD: 8/100  8/300

| | BACKS | | | THROUGH POWER PLUS PARTS | | | | | |
|---|---|---|---|---|---|---|---|---|---|
| | CT (M) | NOM | CURVES 0.125 | ERR | NOM. | ACTUAL | ERR | NOM | ACTUAL |
| PLUS PARTS | 0.0046 | 3.88 | 3.875 | | | 4.29 | | | 4.34 |
| | 0.0044 | 4.00 | 4.000 | | | 4.17 | | | 4.22 |
| | 0.0042 | 4.13 | 4.125 | 0.04 | 4.00 | 4.04 | | | 4.09 |
| | 0.0040 | 4.25 | 4.250 | | | 3.91 | −0.04 | 4.00 | 3.96 |
| | 0.0037 | 4.38 | 4.375 | 0.04 | 3.75 | 3.79 | | | 3.84 |
| | 0.0035 | 4.50 | 4.500 | | | 3.66 | −0.04 | 3.75 | 3.71 |
| | 0.0033 | 4.63 | 4.625 | 0.04 | 3.50 | 3.54 | | | 3.58 |
| | 0.0031 | 4.75 | 4.750 | | | 3.41 | −0.04 | 3.50 | 3.46 |
| | 0.0029 | 4.88 | 4.875 | 0.03 | 3.25 | 3.28 | | | 3.33 |
| | 0.0027 | 5.00 | 5.000 | | | 3.16 | −0.04 | 3.25 | 3.21 |
| | 0.0025 | 5.13 | 5.125 | 0.03 | 3.00 | 3.03 | | | 3.08 |
| | 0.0023 | 5.25 | 5.250 | | | 2.90 | −0.05 | 3.00 | 2.95 |
| | 0.0021 | 5.38 | 5.375 | 0.03 | 2.75 | 2.78 | | | 2.83 |
| | 0.0018 | 5.50 | 5.500 | | | 2.65 | −0.05 | 2.75 | 2.70 |
| | 0.0016 | 5.63 | 5.625 | 0.03 | 2.50 | 2.53 | | | 2.57 |
| | 0.0014 | 5.75 | 5.750 | | | 2.40 | −0.05 | 2.50 | 2.45 |
| | 0.0012 | 5.88 | 5.875 | 0.02 | 2.25 | 2.27 | | | 2.32 |
| MINUS PARTS | 0.0010 | 6.00 | 6.000 | | | 2.15 | | | 2.20 |
| | 0.0010 | 6.13 | 6.125 | | | 2.03 | | | 2.08 |
| | 0.0010 | 6.25 | 6.250 | | | 1.91 | | | 1.96 |
| | 0.0010 | 6.38 | 6.375 | | | 1.80 | | | 1.84 |
| | 0.0010 | 6.50 | 6.500 | | | 1.68 | | | 1.73 |
| | 0.0010 | 6.63 | 6.625 | | | 1.56 | | | 1.61 |
| | 0.0010 | 6.75 | 6.750 | | | 1.44 | | | 1.49 |
| | 0.0010 | 6.88 | 6.875 | | | 1.33 | | | 1.37 |
| | 0.0010 | 7.00 | 7.000 | | | 1.21 | | | 1.26 |
| | 0.0010 | 7.13 | 7.125 | | | 1.09 | | | 1.14 |
| | 0.0010 | 7.25 | 7.250 | | | 0.97 | | | 1.02 |
| | 0.0010 | 7.38 | 7.375 | | | 0.86 | | | 0.90 |
| | 0.0010 | 7.50 | 7.500 | | | 0.74 | | | 0.79 |
| | 0.0010 | 7.63 | −0.05 | | | 0.62 | | | 0.67 |
| | 0.0010 | 7.75 | 7.750 | | | 0.50 | | | 0.55 |
| | 0.0010 | 7.88 | 7.875 | | | 0.39 | | | 0.43 |

What we claim is:

1. A series of back wafers of varying power for a laminated ophthalmic lens, each back wafer having a concave back surface with a curvature that determines the power of the wafer, wherein the curvatures of the concave back surfaces of adjacent back wafers in the series differ from one another and provide successive ones of the back wafers with powers that differ by at most ⅛ of a diopter.

2. A series according to claim 1 wherein the said successive ones of said back wafers have powers that differ by ⅛ of a diopter.

3. A plurality of back wafers for use in producing an ophthalmic lens by laminating a selected one of said back wafers with a front wafer to provide a lens which meets the requirements of a specific ophthalmic prescription, wherein said back wafers have concave back surface curvatures that determine the powers of the back wafers and wherein said plurality of back wafers provides a continuous range of back wafer powers that differ by a uniform increment of ⅛ diopter at most.

4. A method of producing a laminated lens comprising the steps of
(a) providing a stock of front wafers of various designs, including progressive designs;
(b) providing a stock of back wafers including a series whose successive members have concave curvatures that establish a ⅛ diopter difference between the powers of successive ones of said series; and
(c) selecting a wafer from each stock and laminating them together to produce a multifocal lens of the required design and power.

* * * * *